(12) United States Patent
Kalmanash et al.

(10) Patent No.: US 7,342,719 B1
(45) Date of Patent: Mar. 11, 2008

(54) PROJECTION SCREEN WITH REDUCED SPECKLE

(75) Inventors: Michael H. Kalmanash, Los Altos, CA (US); Sushil Krishnamurthy, Sunnyvale, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 481 days.

(21) Appl. No.: 10/877,899

(22) Filed: Jun. 25, 2004

(51) Int. Cl.
*G03B 21/56* (2006.01)
*G03B 21/60* (2006.01)

(52) U.S. Cl. ...................................... 359/452; 359/460
(58) Field of Classification Search ................ 359/452, 359/453, 619
See application file for complete search history.

(56) References Cited

U.S. PATENT DOCUMENTS

| | | | |
|---|---|---|---|
| 5,880,887 A * | 3/1999 | Goto ........................... 359/626 |
| 6,172,814 B1 * | 1/2001 | Watanabe et al. ............ 359/619 |
| 6,278,546 B1 * | 8/2001 | Dubin et al. ................. 359/452 |
| 6,344,263 B1 * | 2/2002 | Moshrefzadeh et al. .... 428/206 |
| 6,466,368 B1 | 10/2002 | Piepel et al. |
| 6,535,333 B1 | 3/2003 | Piepel et al. |
| 6,567,215 B2 * | 5/2003 | Ballen et al. ................. 359/453 |
| 6,846,089 B2 * | 1/2005 | Stevenson et al. .......... 362/627 |
| 6,867,928 B2 * | 3/2005 | Wolfe .......................... 359/707 |
| 6,934,080 B2 * | 8/2005 | Saccomanno et al. ....... 359/460 |
| 2003/0163367 A1 | 8/2003 | Piepel et al. |

* cited by examiner

*Primary Examiner*—Christopher Mahoney
(74) *Attorney, Agent, or Firm*—Nathan O. Jensen; Kyle Eppele

(57) ABSTRACT

The projection screen assembly minimizes speckle while preserving high ambient viewability. The screen assembly, having a light-source side and a viewing side, includes a screen layer, a polarizing contrast filter, and a speckle contrast reducing layer. The screen layer disperses light passing through the screen assembly from the light-source side. The polarizing contrast filter is disposed on the viewing side of the screen layer and reduces ambient glare. The speckle contrast reducing layer is disposed on the light-source side of the screen layer and reduces speckle formed in projected images on the viewing side of the screen assembly.

19 Claims, 2 Drawing Sheets

PROJECTION SCREEN WITH REDUCED SPECKLE

FIELD OF THE INVENTION

The present invention relates generally to projection screens. More particularly, the present invention relates to projection screens with reduced speckle.

BACKGROUND OF THE INVENTION

Rear projection screens are increasingly being used for projection displays in televisions, computer monitors, and other types of displays, for example. In general, rear projection display screens need to have high transmittance while minimizing ambient reflections to ensure adequate brightness and contrast. These characteristics are particularly necessary for displays viewed in high ambients, such as in avionics applications.

Beaded screens provide high transmittance with minimal ambient reflections. Beaded screen suffer, however, from a variety of visual artifacts, including sparkle or speckle. Such defects can occur as a result of local bead defects, or when light transmitted by a particular portion of the screen is mutually coherent with light transmitted by a neighboring portion of the screen. The mutually coherent light from neighboring portions of the screen interferes as it propagates away from the screen. A viewer's eye integrates such interference over the whole screen, with the result being that the viewer sees a number of bright spots across the screen. Both causes are referred to herein as speckle. The speckle decreases the viewability of the image projected from the screen.

A measure of speckle is the speckle contrast, which is defined as the ratio of the standard deviation of the pixel brightness over the average pixel brightness. If the speckle contrast of a screen is above a certain level, the speckle in the viewed image can be significantly distracting to the viewer. Accordingly, it is important to reduce the speckle contrast to a level acceptable to the viewer while substantially preserving other screen characteristics.

When screens are designed to enhance one or more particular characteristic, it is often found that other characteristics are degraded, or the cost of the screen assembly, or its complexity, is increased. For example, the introduction a component to the screen for reducing glare may adversely affect one of the other screen characteristics, such as gain, resolution or speckle. Ideally, measures taken to reduce speckle should affect the other screen characteristics as little as possible.

One proposed solution to the problem of speckle is described in U.S. Pat. No. 6,466,368 entitled "Rear Projection Screen with Reduced Speckle." However, this proposed solution has disadvantages. For example, it describes use of a diffuser layer on the front of the screen from the viewer side. A diffuser layer on the front of the screen affects the high ambient contrast of the display because backscatter of incident ambient light from the diffuser layer significantly increases the reflectivity of the screen assembly.

Thus, there is a need to reduce speckle in projection screens while substantially maintaining the other screen characteristics. Further, there is a need to reduce speckle without adversely affecting contrast. Even further, there is a need for projection screens configured for the unique aspects of high ambients experienced in avionics applications.

SUMMARY OF THE INVENTION

The present invention minimizes speckle in projection screens while preserving excellent high ambient viewability. In particular, one exemplary embodiment relates to a screen assembly having a light-source side and a viewing side. The screen assembly includes a screen layer, a polarizing contrast filter, and a speckle contrast reducing layer. The screen layer disperses light passing through the screen assembly from the light-source side. The polarizing contrast filter is disposed on the viewing side of the screen layer and reduces ambient glare. The speckle contrast reducing layer is disposed on the light-source side of the screen layer and reduces speckle formed in projected images on the viewing side of the screen assembly.

Another exemplary embodiment relates to a projection screen including a substrate, a polarizing contrast filter, and a diffuser layer. The substrate has a plurality of beads on a light-source side. The polarizing contrast filter is located on a viewing side of the substrate. The diffuser layer is located proximate the plurality of beads on the light-source side of the substrate.

Still another exemplary embodiment relates to a rear projection screen assembly, having a light-source side and a image-viewing side. The screen assembly includes a means for dispersing light passing through the screen assembly from the light-source side, a means for filtering and polarizing incident ambient light disposed on the image-viewing side and reducing ambient glare, and a means for reducing speckle contrast disposed on the light-source side of the means for dispersing light and reducing speckle formed in projected images on the image-viewing side of the screen assembly.

BRIEF DESCRIPTION OF THE DRAWINGS

The exemplary embodiments will be described with reference to the accompanying drawings, wherein like numerals denote like elements.

DETAILED DESCRIPTION OF EXEMPLARY EMBODIMENTS

Figure 1:
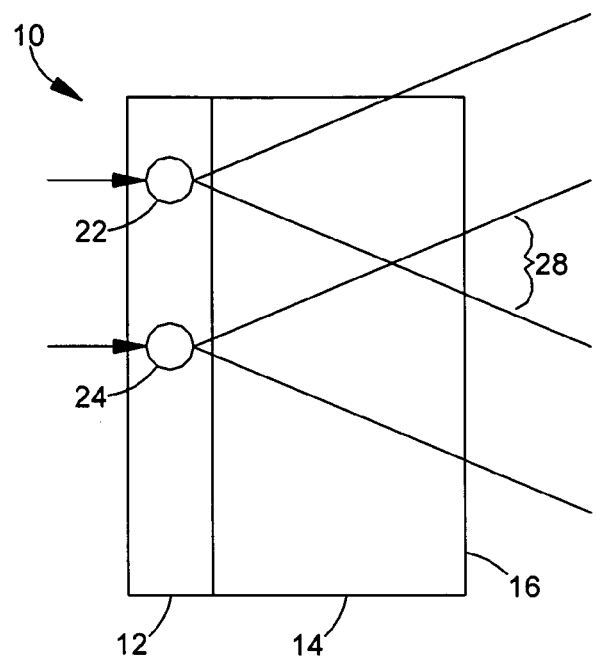
FIG. 1 is a diagram depicting a cross-sectional side view of a projection screen assembly with speckle resulting from light interference patterns on the screen surface.

FIG. 1 illustrates a projection screen assembly 10 including a screen layer 12 that disperses light. The screen layer 12 can be a bulk diffuser layer or a refractively dispersing layer (e.g., a beaded layer) supported on a substrate layer 14. The substrate layer 14 can be made of glass and can have a matte surface or antireflective-coated surface 16 located on the surface opposite the screen layer to reduce glare.

Light passing a region 22 in the screen layer 12 diverges and overlaps with light passing a region 24 in the screen layer 12. An interference pattern results in an overlapping region 28. The matte surface 16 on the substrate layer 14 acts as a screen to display the interference pattern. Points of constructive interference in the overlapping region 28 appear brighter on the matte surface 16 and points of destructive interference in the overlapping region 28 appear darker on the matter surface 16, resulting in the appearance of speckle to the viewer.

Speckle also arises using other types of screen layers, such as bulk diffusers and lenticular dispersing layers. Speckle is often quantified by calculating the speckle contrast, defined as the standard deviation of the brightness measured across the screen divided by the average screen brightness. Thus, a given deviation in screen brightness measured in absolute terms produces a higher speckle contrast when the average screen brightness is low.

Speckle is an increasing problem for display screens because as light projector devices become smaller, speckle is more of a concern. Light coming from a projection lens with a finite pupil diameter is partially coherent, with the coherence length being dependent on the diameter of the projection lens. Everything else being equal, the smaller the lens diameter, the longer the coherence length. Accordingly, the coherence length of the light reaching a screen in an advanced display is longer, increasing the appearance of speckle.

Figure 2:
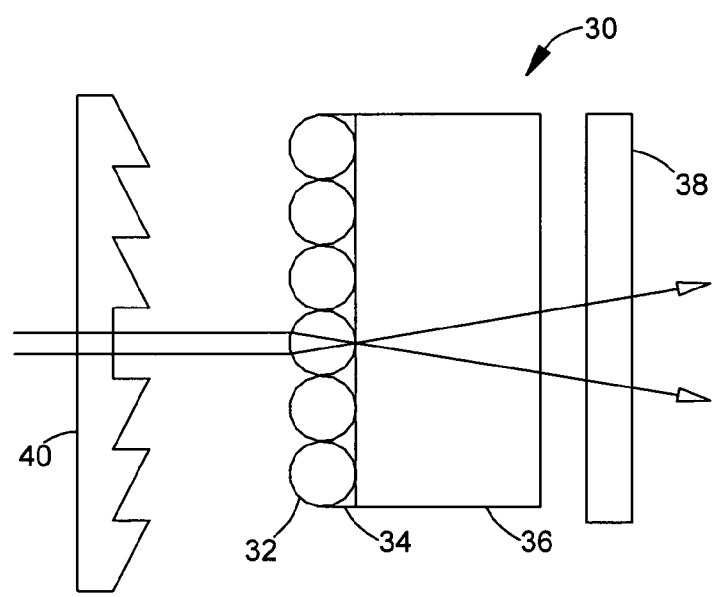
FIG. 2 is a diagram depicting a cross-sectional side view of a beaded screen assembly projecting an image with high efficiency according to conventional techniques.

FIG. 2 illustrates a projection screen assembly 30 having a beaded film 32, a black resin 34, a glass substrate 36, a contrast filter 38, and a lens 40. Beaded film 32 includes pressed glass micro-beads located on the black resin 34 which is laminated onto the glass substrate 36. The micro-beads of the beaded film 32 gather light from the lens 40 and channel it through the beads to exit at the bead-substrate junction. Ambient light is largely absorbed by the black resin 34, providing reflectivity of less than 1.0%, for example. Beaded screens are particularly efficient due to high transmittance of glass beads. Advantageously, this combination of high transmittance and low reflectivity ensures excellent sunlight readability.

In certain applications (e.g., avionics), further reduction of screen reflectance is needed. Thus, the contrast filter 38 is added to the front of the screen. The contrast filter 38 is typically an absorptive element. Accordingly, display luminance is reduced by Ta (the transmittance of the absorptive contrast filer), but reflectance is reduced to a greater extent (by a factor of $Ta^2$), for a net gain in high ambient contrast. The lens 40, which can be a Fresnel lens, can be placed behind the viewing screen, with the purpose of collimating the light from the projection lens and ensuring good luminance uniformity.

Beaded screens exhibit viewing artifacts that can be traced to variables in the screen manufacturing process, including cracked and missing beads that permit collimated light to reach the observer without being scattered into the defined viewing cone by the screen. Since different defects channel this light in different directions, the observer can see a sort of sparkle which moves at his position with respect to the screen changes. Graininess is visible on these screens, due to non-uniformities in bead packing density and depth of bead penetration into the black resin 34.

In applications where a lens is located proximate screen layer 12, the collimated light from the lens impinges on the beads and is refracted to pass through the front of the beads, which are not covered by the black resin 34. If the beads are round and clear, the light is spread into the viewing cone, but if a bead is missing or cracked then collimated light incident on that bead is not scattered, but emits in a particular direction, with high intensity. Such points appear as bright spots, and different spots are apparent to the viewer in different positions.

Figure 3:
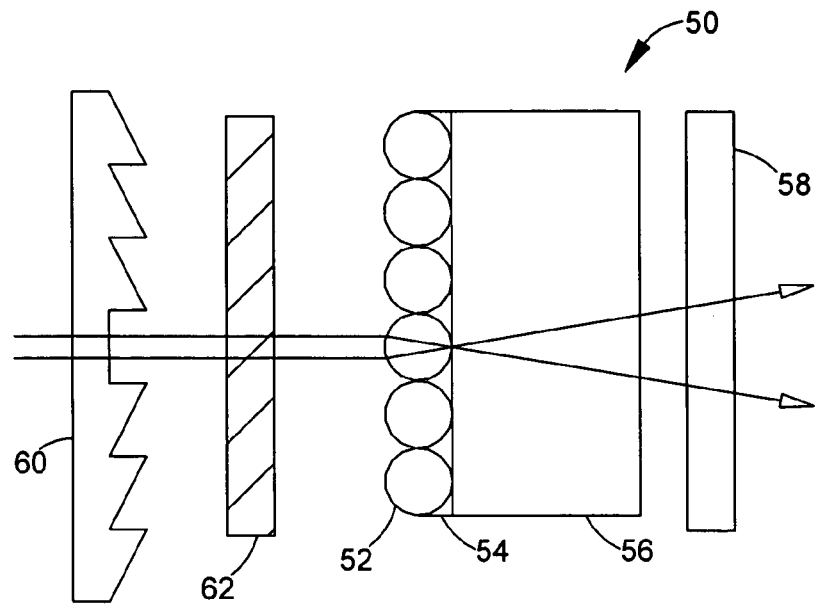
FIG. 3 is a diagram depicting a cross-sectional side view of a beaded screen assembly in accordance with an exemplary embodiment.

FIG. 3 illustrates a exemplary projection screen assembly 50 having a beaded film 52, a black resin 54, a substrate 56, a polarizing contrast filter 58, a lens 60, and a diffuser 62. The diffuser 62 can be a light diffuser, such as a hologram, that improves artifacts in the screen assembly 50. The diffuser 62 provides a degree of scatter to the collimated light exiting the lens 60, sufficient to mask the viewing artifacts but not sufficient to noticeably reduce system resolution.

The diffuser 62 can result in a reduction of screen transmittance (lowering brightness) and an increase in ambient reflectance (lowering contrast). The polarizing contrast filter 58 can be a linear polarizer that increases transmittance and reduces reflectance. Accordingly, deficiencies introduced as a result of the diffuser 62 can be overcome.

Assuming that the polarizing contrast filter 58 has a transmittance Tp, with respect to polarized light, its transmittance with respect to unpolarized light is essentially Tp/2. If the projection system uses LCD microdisplay imagers, then light from the projection optics is polarized. Since the beaded screen is highly polarization-preserving, that means that the projected image is well-polarized when it enters the contrast filter. In terms of luminance, if Tp is the same is Ta (the transmittance of the absorptive contrast filter 38 in FIG. 2), the effects of the two filters are equivalent. In terms of ambient reflections, however, the reduction factor for the absorptive filter 38 (FIG. 2) is $Ta^2$, while that for the polarizing contrast filter 58 (FIG. 3) is $(Tp/2)^2$, since the ambient light is unpolarized.

For a typical avionics display, Ta (=Tp) is approximately 70% (0.7). In this example, the reduction in ambient light reflected from the display when using the polarizing contrast filter is $1/(0.7/2)^2$, or more than 8 times the reduction due to the absorptive filter. This improvement in reflectance more than compensates for any negative effects of the diffuser, and permits a high contrast, high brightness projector with reduced speckle.

Figure 4:
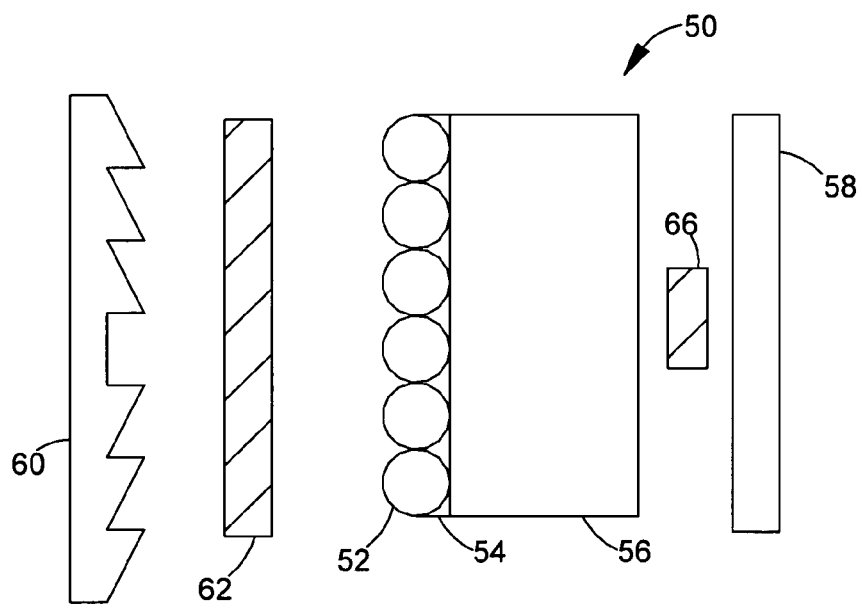
FIG. 4 is a diagram depicting a cross-sectional side view of the beaded screen assembly of FIG. 3 having a quarter wave plate (QWP) in accordance with another exemplary embodiment.

FIG. 4 illustrates the exemplary projection screen assembly 50 described with reference to FIG. 3 with the addition of a quarter wave plate (QWP) 66 located between the linear polarizer 58 and the beaded screen 52. The QWP 66 has the effect of removing any components of the reflected ambient that were preferentially polarized. It does not interfere with filter transmittance, nor does it affect the ability of the linear polarizer 58 to attenuate the non-polarizing components of the reflected ambient. The addition of the QWP 66 effectively results in the replacement of the linear polarizer in the polarizing contrast filter 58 with a circular polarizer. Advantageously, the polarizing contrast filter 58 and the QWP 66 provide improved contrast with or without the diffuser 62 described with reference to FIG. 3.

The diffuser 62 described with reference to FIGS. 3 and 4 maintains the black appearance of the screen assembly 50. Accordingly, the contrast in the screen assembly 50 is preserved. Diffuser layers located on the front (viewer side) of the screen reduce ambient contrast because incident ambient light backscatters from the diffuser layer.

Avionics applications generally are subject to direct sunlight, requiring projection screens with lower reflectivity to achieve desired contrast. As such, the polarizing contrast filter 58 described with reference to FIGS. 3 and 4 is particularly advantageous in avionics applications. Replacing a conventional absorptive contrast enhancement filter by a polarizing filter offers significant increases in performance (both luminous efficiency and contrast).

It is understood that although the detailed drawings and specific examples describe exemplary embodiments of projection screens with reduced sparkle, they are for purposes of illustration only. The exemplary embodiments are not limited to the precise details and descriptions described herein. For example, although particular lenses, materials, and structures are described, other lenses, materials, and structures could be utilized according to the principles of the present invention. Various modifications may be made and the details disclosed without departing from the spirit of the invention as defined in the following claims.

What is claimed is:

1. A screen assembly having a light-source side and a viewing side, the assembly comprising:
    a screen layer to disperse light passing through the screen assembly from the light-source side;
    a polarizing contrast filter disposed on the viewing side of the screen layer, the polarizing contrast filter reducing ambient glare; and
    a speckle contrast reducing layer disposed on the light-source side of the screen layer and reducing speckle formed in projected images on the viewing side of the screen assembly,
    wherein the polarizing contrast filter is configured to both absorb and reflect to compensate for negative effects of the speckle contrast reducing layer, and further wherein the screen layer comprises a bulk diffusing element which is distinct from the speckle contrast reducing layer.

2. The screen assembly of claim 1, wherein the screen layer is an image-forming, light dispersing element.

3. The screen assembly of claim 2, wherein the screen layer includes a beaded film.

4. The screen assembly of claim 2, wherein the screen layer includes a lenticular-lens.

5. The screen assembly of claim 1, wherein the screen layer comprises glass.

6. The screen assembly of claim 1, further comprising a quarter wave plate (QWP) between the polarizing contrast filter and the screen layer.

7. The screen assembly of claim 1, further comprising a lens on the light-source side of the screen layer, wherein the speckle contrast reducing layer is located between the lens and the screen layer.

8. The screen assembly of claim 7, wherein the lens is a Fresnel lens.

9. A projection screen comprising
    a substrate having a plurality of beads on a light-source side;
    a polarizing contrast filter located on a viewing side of the substrate; and
    a diffuser layer located proximate the plurality of beads on the light-source side of the substrate,
    wherein the polarizing contrast filter is configured to both absorb and reflect to compensate for negative effects of the diffuser layer.

10. The projection screen of claim 9, further comprising a quarter wave plate disposed between the polarizing contrast filter and the substrate, the quarter wave plate converting a linear polarizer in the polarizing contrast filter to a circular polarizer.

11. The projection screen of claim 9, further comprising a Fresnel lens located on the light source side of the diffuser layer.

12. The projection screen of claim 9, wherein the plurality of beads are located in a black resin on the glass substrate.

13. The projection screen of claim 12, wherein the black resin absorbs ambient light to provide reflectivity of less than 1%.

14. The projection screen of claim 9, wherein the diffuser layer comprises a surface hologram.

15. A rear projection screen assembly having a light-source side and a image-viewing side, the screen assembly comprising
    a means for dispersing light passing through the screen assembly from the light-source side;
    a means for filtering and polarizing incident ambient light disposed on the image-viewing side and reducing ambient glare; and
    a means for reducing speckle contrast disposed on the light-source side of the means for dispersing light and reducing speckle formed in projected images on the image-viewing side of the screen assembly,
    wherein the means for filtering and polarizing incident ambient light is configured to both absorb and reflect to compensate for negative effects of the means for reducing speckle contrast.

16. The screen assembly of claim 15, further comprising means for converting a linear polarizer in the means for filtering and polarizing incident ambient light to a circular polarizer.

17. The screen assembly of claim 15, wherein the screen assembly is incorporated into an avionics system.

18. The screen assembly of claim 15, wherein a value of speckle contrast for the screen assembly is less than 5%.

19. The screen assembly of claim 15, further comprising means for absorbing ambient light to provide reflectivity of less than 0.5%.

* * * * *